UNITED STATES PATENT OFFICE.

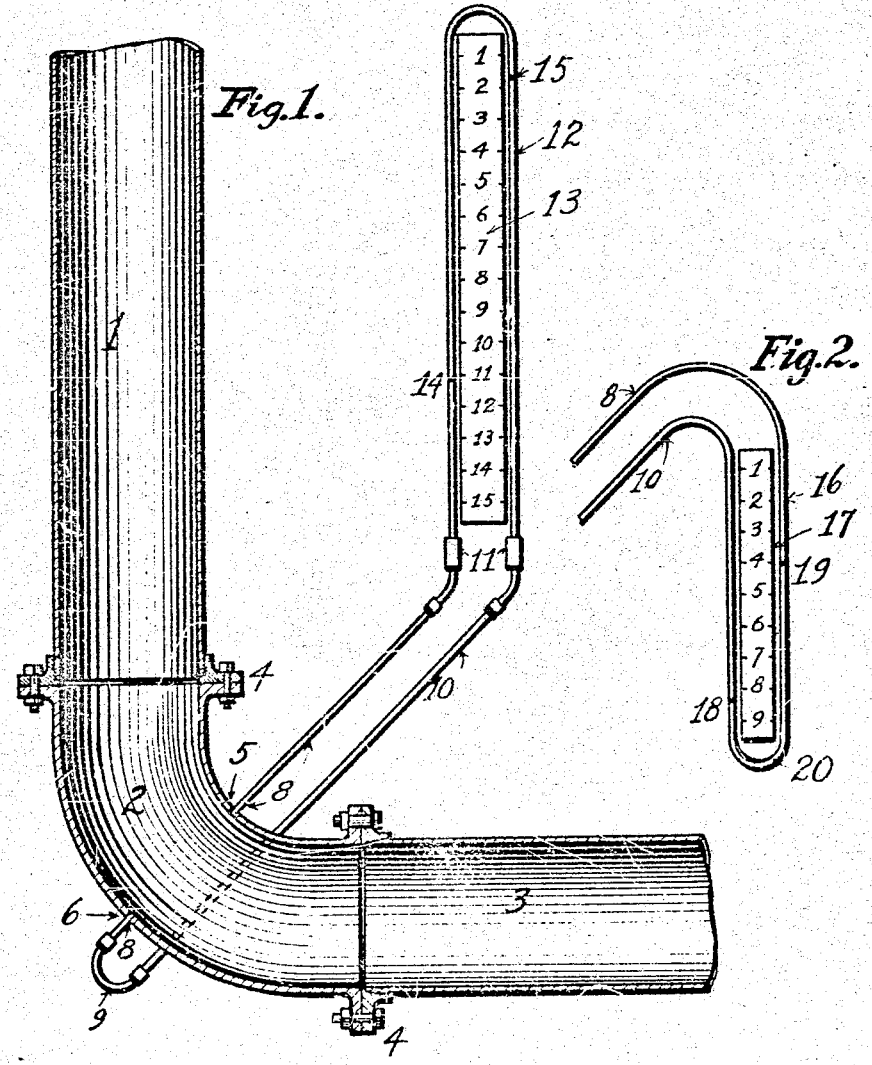

JAMES BUCKNER SPEED, OF BERKELEY, CALIFORNIA, ASSIGNOR OF ONE-HALF TO ANDREW MURRAY HUNT, OF BERKELEY, CALIFORNIA.

METHOD OF MEASURING THE FLOW OF FLUIDS.

970,965.  Specification of Letters Patent.  Patented Sept. 20, 1910.

Application filed August 10, 1909.  Serial No. 512,213.

*To all whom it may concern:*

Be it known that I, JAMES BUCKNER SPEED, a citizen of the United States, residing at Berkeley, in the county of Alameda and State of California, have invented a new and useful Improvement in the Art of Measuring the Flow of Fluids, of which the following is a specification.

This invention relates to the art of measuring the flow of fluids by reference to the differences in pressures caused by the flowing of the fluid in a curved pipe or curved conduit, and has for its object to render the measurements easy and of easy application to existing pipes or conduits in many cases.

In measuring the flow of fluids a method known as the Venturi tube method is in use which consists in causing all the fluid to flow through a conduit having two different cross sectional areas connected by a converging passage, a determination of the difference in pressure existent in the fluid at the two different cross sections and knowledge of the areas of the cross sections affording an accurate means of measuring the flow of fluids.

In my process, I measure the difference in pressure which is existent between that part of the fluid flowing through a curved pipe or conduit, which is at the concave surface of the pipe or conduit, and that part of the fluid which is at the convex surface of the pipe or conduit.

Referring to the accompanying drawings, I have shown an elemental apparatus by means of which my process may be carried out, though it is understood that I do not confine myself to such apparatus.

Figure 1, shows the longitudinal section of a pipe line and elbow, and a pressure gage and connecting pipes in elevation. Fig. 2 shows a U tube form of pressure gage and connecting pipes, in elevation.

Referring to Fig. 1, 1 and 3 are pipes connected to an elbow 2 by flanges 4.

5 and 6 are holes in the elbow 2, diametrically opposite each other, this diameter is the intersection of the plane of the paper and a plane perpendicular to the paper, which bisects the angle of intersection of the pipes 1 and 3. It is not essential that the pipes 1 and 3 should be at right angles however, but good results are not obtained with what are termed 60 degree elbows. Neither is it essential that the diameter joining the centers of holes 5 and 6 shall exactly bisect the angle between pipes 1 and 3, but the most valuable results are obtained by thus locating it. I have shown the pipes 8 screwed into the holes 5 and 6, and connected to the return bend 9 and pipe 10. In case the fluid to be measured is a liquid, I attach by suitable connections 11 a glass U-tube 12 provided with a graduated scale 13. Some air being in the U-tube, any difference in pressure in pipes 8 and 10 is observable by reading the heights to which the water-columns 14 and 15 rise, and subtracting them.

In case the fluid to be measured is air or any gas, I attach a glass U-tube as shown in Fig. 2, in which 16 is a U-tube and 17 is a scale. I then put any suitable liquid of known density, as water, in the bottom of the U-tube as indicated by 20, and any difference in the pressures in pipes 8 and 10 is observable by reading the heights at which the water-columns 18 and 19 stand and subtracting them.

The explanation of the difference in pressure found existent between the inside and outside of an elbow or curved conduit is that it is due to the inertia of the flowing fluid, or as commonly expressed, centrifugal force. A long series of experimental runs made in my hydraulic laboratory with a large number of large and small elbows has given the following equation connecting the difference in pressure as above measured with the rate of flow. For elbows of 90 degree turn, having circular cross section—in fact, ordinary water main elbows of cast iron—the difference in pressure measured in feet of water head, and called "$h$"; the diameter of the circular cross section of the elbow measured in feet, and called "$d$"; the radius of the center line or curving axis of the elbow measured in feet, and called "$r$"; and the total discharge in cubic feet per second divided by the cross sectional area in square feet called "$v$"; my experiments have given the relation $$V = 5.60^{1.3}\sqrt{h\frac{r}{d}}$$

which is correct to within two per cent. over a rather large range of all the quantities involved. So far I have only used water in these experiments, but as long as the difference of head "$h$" is measured by the columns of the liquid flowing, I believe the relation will be quite independent of the viscosity of the fluid, and also independent of its density. When this method is used for measuring the rate of flow of air or gases and the difference of pressures is measured by such a gage as shown in Fig. 2, then the difference in head "$h$" must be multiplied by the ratio of the densities of the fluids; thus, if I were measuring the flow of air, I would multiply the value of the term "$h$" by the ratio of the density of the liquid in the U-tube to the density of the fluid in the elbow 2.

It is clear that I may use any sort of pressure gages instead of the kind shown.

I claim:

1. A process of measuring the rate of flow of a fluid which is flowing in a curved conduit which it fills, which process consists in observing the difference in pressure resulting from said flow between the concave and convex sides of said curved conduit, and computing the rate of flow from the data consisting of the geometrical description of the curved conduit and the said observed difference of pressure.

2. A process of measuring the rate of flow of a fluid which consists first in causing the fluid to flow through a curved conduit which is filled by the fluid and has a uniform circular cross section, and the center line thereof a constant radius of curvature for a part at least of the length of the curved portion; second, in measuring the difference between the pressures on the inner surfaces of the concave and the convex sides of said part; third, in computing the flow according to a suitable rule which takes into account the diameter of the circular section, the radius of curvature of the curved conduit where it is uniform, and the said difference in pressure.

3. A process of measuring the rate of flow of a fluid which consists in causing the fluid to flow through a circular conduit having a bend or turn in its course of at least 45 degrees change in direction, said bend having a circular cross section substantially equal in diameter to the rest of the conduit, in observing the difference in pressure caused by the flow, and which exists between the concave and the convex parts of the curved conduit, and in computing the flow according to a suitable rule which takes into account the diameter of the circular section, the radius of curvature of the circular conduit where it is uniform, and the said observed difference in pressures.

JAMES BUCKNER SPEED.

Witnesses:
  EARLE H. WEBB,
  M. S. BROWNE.